United States Patent

[11] 3,613,018

| [72] | Inventors | Valentin Mikhailovich Sitnichenko<br>ul. Odesskaya, 58/6, kv. 12;<br>Andrei Isakovich Kogut, ul. Pionerskaya,<br>20, kv. 12, both of Odessa, U.S.S.R. |
|------|-----------|---|
| [21] | Appl. No. | 856,351 |
| [22] | Filed | Sept. 9, 1969 |
| [45] | Patented | Oct. 12, 1971 |

[54] A DEVICE FOR DETECTING THE ENVELOPE OF A SINGLE-POLARITY PULSATING VOLTAGE
3 Claims, 1 Drawing Fig.

[52] U.S. Cl. .................................................. 329/101,
307/246, 328/151
[51] Int. Cl. .................................................. H03d 1/18
[50] Field of Search ........................................... 329/50,
101, 102, 103; 307/246; 328/151, 134

[56] References Cited
UNITED STATES PATENTS

| 3,206,689 | 9/1965 | Santana ........................ | 307/246 X |
| 3,314,014 | 4/1967 | Perkins ........................ | 328/134 |
| 3,390,381 | 6/1968 | Shepard ........................ | 328/151 X |
| 3,428,828 | 2/1969 | Korzekwa et al. ............ | 328/151 X |

Primary Examiner—Alfred L. Brody
Attorney—Waters, Roditi & Schwartz

ABSTRACT: A device for detecting the envelope of a single-polarity pulsating voltage comprising a fixed memory capacitor with a charge circuit and a discharge circuit, a memory cell controlling the capacitor discharge circuit, a circuit for comparison of the pulsating voltage with the capacitor charge voltage connected to one input of the memory cell, and a source of gate pulses recurring at the pulsation frequency connected to the second input of the memory cell.

PATENTED OCT 12 1971 3,613,018
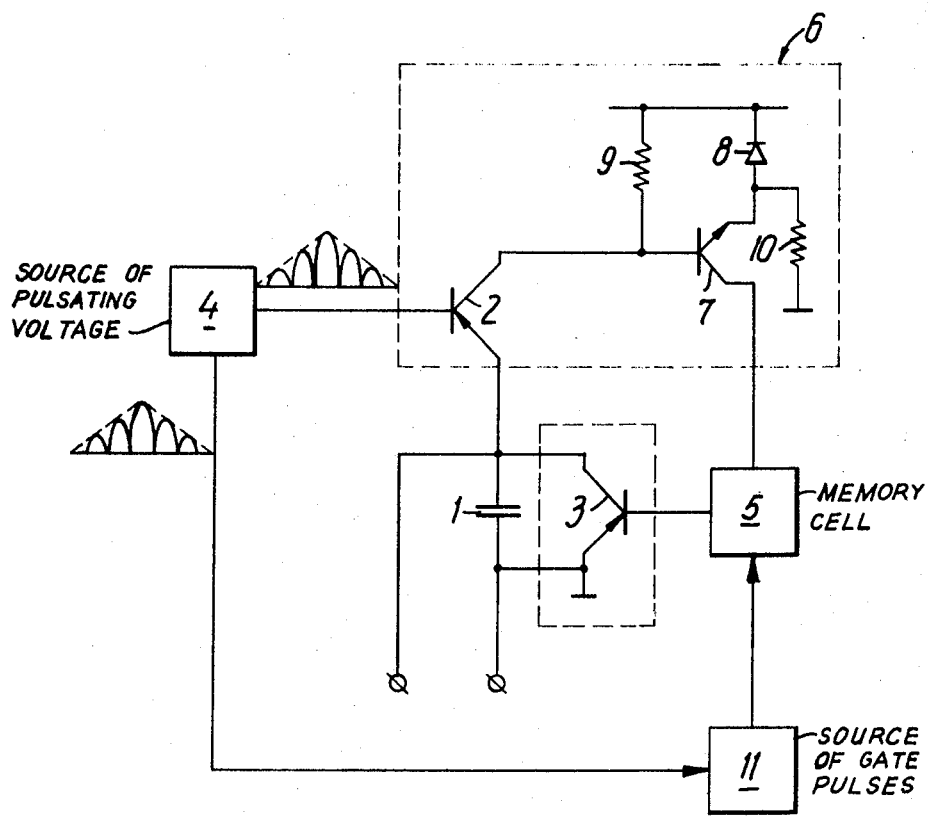

A DEVICE FOR DETECTING THE ENVELOPE OF A SINGLE-POLARITY PULSATING VOLTAGE

The present invention relates to devices for detecting the envelope of a single-polarity pulsating voltage and can be used in automatic control systems in which the envelope of a pulsating voltage serves as a mismatch signal.

The known devices for detecting the envelope of a single-polarity pulsating voltage comprise a fixed memory capacitor with a charge circuit and a discharge circuit to which the pulsating voltage is applied through the charge circuit.

In radio devices wherein the ratio between the pulsation frequency and the envelope frequency is sufficiently high the envelope can be detected easily enough. However, in signal conversion circuits of automatic control systems the envelope frequency may differ but little from the pulsation frequency and the envelope is detected with appreciable inaccuracy. For example, at the time the envelope begins to sharply fall, the memory capacitor either retains the previous magnitude of the envelope or this previous magnitude falls slowly (at a rate determined by the discharge time constant of the capacitor). The resultant time lag causes a dynamic error and, when the control system comprising this device follows up the signal at a high speed, the error may become so large that it exceeds the followup zone and the system is rendered inoperable.

An object of the invention is to provide a device for detecting the envelope of a single-polarity pulsating voltage comprising a memory capacitor with controlled discharge, which could be used in automatic control systems without affecting their accuracy or speed of operation.

With this and other objects in view, the device for detecting the envelope of a single-polarity pulsating voltage comprising a fixed memory capacitor with a charge circuit and a discharge circuit to which pulsating voltage is applied through the charge circuit has, according to the invention, a memory cell which controls the discharge circuit of the memory capacitor, one input of said cell being connected to the circuit for comparison of the pulsating voltage with the capacitor charge voltage, and the other input, to the source of gate pulses recurring at the pulsation frequency.

Other objects and advantages of the present invention will be best understood from the following description of its possible embodiment when read in connection with the accompanying drawing which is a diagram showing the device for detecting the envelope of a single-polarity pulsating voltage, according to the invention.

The device for detecting the envelope of a single-polarity pulsating voltage comprises a fixed memory capacitor 1 with a charge circuit formed by a transistor 2 and a discharge circuit formed by a switching transistor 3. The transistor 2 is connected to a source 4 of single-polarity pulsating voltage. The device includes a memory cell 5, which may be formed, for example, by a flip-flop, and a comparison circuit 6 comprising transistors 2 and 7, a diode 8 and two resistors 9 and 10, connected to one input of the memory cell 5. The second input of the memory cell is connected to a source 11 of gate pulses recurring at the pulsation frequency of the voltage the envelope of which is to be detected by the device described herein.

The device for detecting the envelope of a pulsating voltage operates as follows.

When a pulsating voltage appears at the output of the source 4, the transistor 2 becomes conductive and the capacitor 1 begins to charge. The collector current of the same transistor turns on the transistor 7, the conductance of which is the reverse of that of the transistor 2. The collector current of the transistor 7, in its turn, cuts off the memory cell 5 maintaining it in the initial condition. At such time the transistor 3 in the capacitor discharge circuit is also nonconductive.

When the voltage at the output of the source 4 drops below the voltage to which the capacitor 1 is charged, the transistor 2 turns off, the transistor 7 is also turned off by the bias voltage applied to its emitter circuit through the diode 8. Meanwhile the memory cell 5 still remains in the initial condition.

If the amplitude of the next pulsation of the pulsating voltage increases or if it remains at the previous level, the capacitor 1 is either charged additionally or remains in the same condition.

If the amplitude of the pulsating voltage drops so low that the voltage at the base of the transistor 2 becomes smaller than the voltage to which the capacitor is charged, the transistors 2 and 7 remain nonconductive while the memory cell 5 is turned on by the source 11 of the gating pulses and makes the transistor 3 conductive. The latter bypasses the capacitor 1 which quickly discharges.

When, as the capacitor 1 is discharging, the emitter potential of the transistor 2 exceeds the base potential of the transistor, the transistor 2 becomes conductive, its collector current drives the transistor 7 into conduction and the transistor 7 resets the memory cell 5 to the initial condition. The memory cell turns off the transistor 3 in the discharge circuit, the capacitor 1 will no longer be discharged and the voltage across the capacitor will be approximately equal to the new amplitude value of the pulsating voltage.

If the voltage at the output of the source 4 drops to zero, the capacitor will be completely discharged as was described above.

The device described herein provides more accuracy than the existing devices in separating the envelope of a single-polarity pulsating voltage when the amplitude of the pulsating voltage decreases, if the pulsation frequency is commensurate with the envelope frequency.

What is claimed is:

1. A device for detecting the envelope of a single-polarity pulsating voltage comprising a fixed memory capacitor, a charge circuit for said capacitor, said pulsating voltage supplied to said capacitor through said charge circuit, a discharge circuit for said capacitor, a comparator circuit for comparison of said pulsating voltage with the charge voltage of said capacitor, a source of gate pulses recurring at the pulsation frequency of said pulsating voltage, a memory cell with two inputs, one input being connected to said comparator circuit and the other input being connected to said source of the gate pulses; said memory cell controlling said discharge circuit of the capacitor quickly discharging the capacitor to a voltage close to the amplitude of the pulsating voltage when the amplitude of the said pulsating voltage decreases.

2. A device as claimed in claim 1, wherein said comparator circuit comprises a first transistor having an emitter, base and collector, said collector being connected to one side of said capacitor and said base receiving said pulsating voltage, a second transistor having an emitter base and collector, said collector of said first transistor being connected to said base of said second transistor, said collector of said second transistor being connected to one input of said memory cell, and said emitter of said second transistor being connected to a biasing source of voltage.

3. A device as claimed in claim 1, wherein said discharge circuit comprises a transistor having an emitter base and collector, said capacitor being connected between said emitter and said collector and said base receiving the output of said memory cell.